March 12, 1946.   V. S. ANDERSON   2,396,406
MOLDING APPARATUS
Filed July 17, 1944
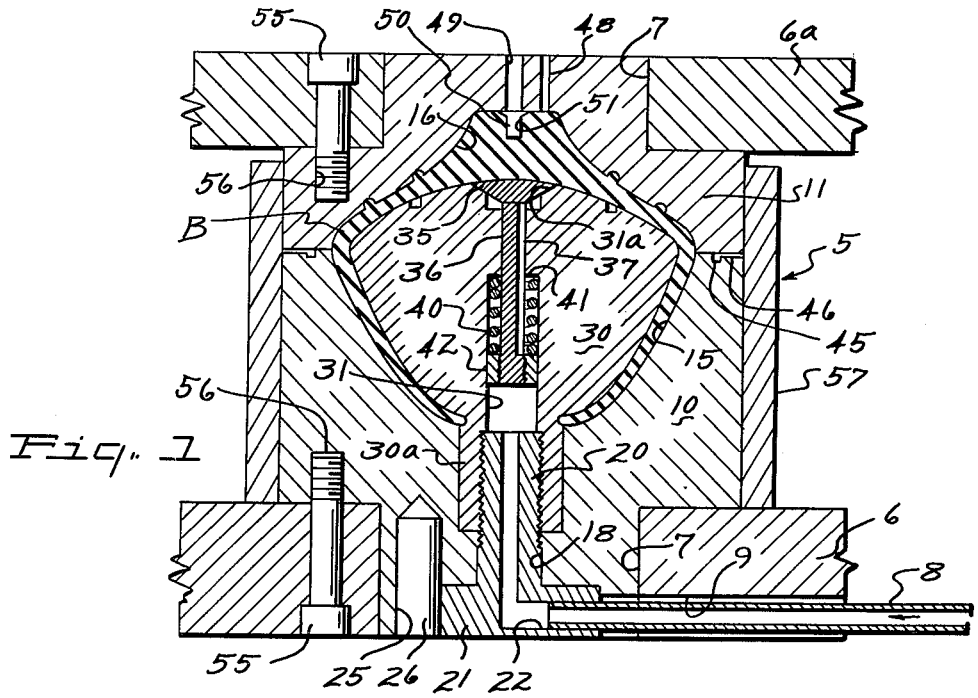
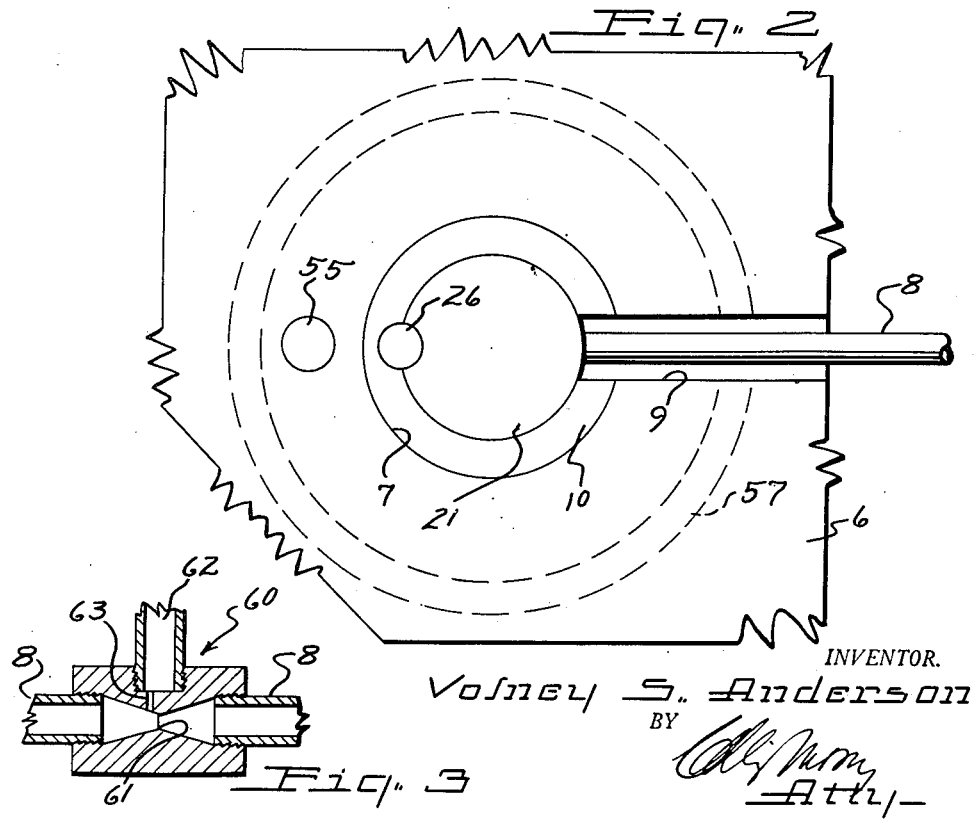
INVENTOR.
Volney S. Anderson
BY
Atty.

Patented Mar. 12, 1946

2,396,406

UNITED STATES PATENT OFFICE 2,396,406

MOLDING APPARATUS

Volney S. Anderson, Los Angeles, Calif.

Application July 17, 1944, Serial No. 545,239

2 Claims. (Cl. 18—34)

This invention has to do with a mold and, in its more particular aspects, relates to molds for producing hollow articles of resilient plastic materials such as rubber.

It is an object of my invention to provide a mold of this character embodying pneumatic means for stripping or ejecting the molded article from the mold after the molding operation has been completed.

Another object of my invention is to provide an economical mold of this character which is capable of rapid and efficient operation.

Another object of my invention is the provision of novel means for lubricating a mold to facilitate stripping.

My invention possesses additional advantageous features of novelty which will become apparent to those skilled in the art from a reading of the following detailed description of one preferred embodiment. In this connection, however, I wish it understood that, in its broader aspects as defined by the accompanying claims, my invention is not to be confined to the precise details of construction and arrangement found in the ensuing description, since it is capable of being embodied in other physical forms differing in detail from those now to be described.

In the following description I shall refer to the accompanying drawing, in which:

Fig. 1 is a medial vertical section through a mold embodying my invention;

Fig. 2 is a view taken on line 2—2 of Fig. 1; and

Fig. 3 is a fragmentary sectional view.

In the drawing the numeral 5 denotes a mold frame having removable cover plates 6, 6a, presenting openings 7. An air or steam tube 8 is mounted in a groove 9 in the lower plate 6, the inlet end of the tube being connected through a conventional control valve, not shown, with a conventional air compressor, not shown.

I mount in the mold frame a pair of mold elements 10, 11, each having an article cavity 15, 16, which mating cavities are here shown as shaped to form an article such as a hollow tank ball B. Referring to the lower mold element 10, it has a round axial opening 18 within which is mounted an exteriorly threaded air-passing tube 20 having an annular flange 21 disposed in the increased diameter lower portion of the opening 18. The flange 21 has a radial bore 22 which receives the discharge end of tube 8 and which communicates with the bore of the tube 20. To prevent rotation of the tube 20 relative to the mold element 10 and to facilitate registering bore 22 with bore 9, I provide a dowel hole 25 in mold element 10, which hole intersects the periphery of the flange 21 and a dowel pin 26 having a tapered inner end is mounted in the hole.

A core member 30 has a longitudinal bore 31, the lower neck end 30a of which is interiorly threaded to receive the threaded upper end of the tube 20, the bore 31 registering with the bore of tube 20. The top end of bore 31 is relatively enlarged and flares outwardly at 31a to provide a seat for a poppet valve 35, whose stem 36 is disposed in bore 31. The stem 36 is longitudinally grooved at 37. A compression spring 40 is disposed around stem 36, seating at its top end against shoulder 41 and bearing at its lower end against a nut 42 which is threaded on to the lower end of the stem 36. Thus the valve 35 is yieldably maintained seated by the spring 40.

An annular overflow cavity 45 is provided around and adjacent the article cavity in either one or both of the mold elements, it being here shown as provided in the lower mold element 10. The overflow cavity 45 merges into an annular space 46 provided between the mold elements, which space communicates with atmosphere.

The top mold element 11 has a vent port 48 and a hole 49 within which the shank of an auxiliary mold element 50 is mounted, the latter mold element being for the purpose of providing in the article an axial hole 51 to receive a stud or other suspending member for the ball B.

The mold elements 10, 11 are secured in their proper relationship to the frame by means of cap screws 55 which screw into threaded openings 56 in the mold elements. The mold elements are embraced by a tubular member 57.

Certain objections are well known in this art to coating the mold with release lubricants, since when thus applied the lubricant will tend to separate the plastic material as it runs down into the mold cavity, resulting in subsequent "cold flow" in the molded article. I have found that those objections can be overcome by injecting the lubricant into the mold after the article has set, as by admixing a suitable lubricant such as oil or glycerine in the steam injected through tube 8. For instance, in Fig. 3, I show a mixing coupling 60 presenting a venturi 61 through which the steam in line 8 passes. A lubricant supply conduit 62 communicates with the venturi through a port 63.

In operation, after the molding is completed, the upper mold element 11 is removed and a momentary blast of air or steam under pressure unseats the valve 35 against the pressure of spring 40, and the air or steam being evenly distributed against the top inner surface of the molded article by the tapered valve, causes the article to be evenly stripped from the core and mold element 10. Inasmuch as the air or steam is introduced under the top portion of the article, the side walls of the article confined between the core and mold 10 are stretched sufficiently to reduce their suction to permit their free release. By admixing lubricant in the steam line, as described, the core and inner surface of the article will be sprayed with the lubricant, further facilitating the stripping operation.

I claim:

1. Molding apparatus for forming hollow articles comprising a pair of companion mold elements having mating recesses together forming an article cavity, means securing the mold elements with their said recesses in mating relationship, an opening disposed upwardly through one of the mold elements, said opening being of round cross-section and being relatively larger in diameter at its bottom end, a fluid-passing tube mounted axially in the opening, said tube having a relatively larger diameter portion rotatably fitting in the bottom end portion of the opening and having an exteriorly threaded inner end, a radial port in the tube communicating with the bore thereof, a fluid passageway in the last-mentioned mold element communicating with said radial port, means cooperating with the tube and the last-mentioned mold element to maintain said radial port and said passageway in register, a core member in the cavity, said core member being threadedly mounted on the inner end of the tube and having a longitudinal bore communicating with the tube, and a check valve controlling said port, said valve seating towards the tube.

2. Molding apparatus for forming hollow articles comprising a pair of companion mold elements having mating recesses together forming an article cavity, means securing the mold elements with their said recesses in mating relationship, an opening disposed upwardly through one of the mold elements, said opening being of round cross-section and being relatively larger in diameter at its bottom end, a fluid-passing tube mounted axially in the opening, said tube having a relatively larger diameter portion rotatably fitting in the bottom end portion of the opening and having an exteriorly threaded inner end, a radial port in the tube communicating with the bore thereof, a fluid passageway in the last-mentioned mold element communicating with said radial port, means cooperating with the tube and the last-mentioned mold element to maintain said radial port and said passageway in register, a core member in the cavity, said core member being threadedly mounted on the inner end of the tube and having a longitudinal bore communicating with the tube, a check valve controlling said port, said valve seating towards the tube, and spring means yieldably urging the check valve toward seated position.

VOLNEY S. ANDERSON.